United States Patent [19]
Catlett

[11] 4,074,458
[45] Feb. 21, 1978

[54] FLY GUN

[75] Inventor: Richard E. Catlett, Port Angeles, Wash.

[73] Assignee: The Raymond Lee Organization, Inc., New York, N.Y. ; a part interest

[21] Appl. No.: 660,711

[22] Filed: Feb. 23, 1976

[51] Int. Cl.² .............................................. A01M 1/06
[52] U.S. Cl. ...................................................... 43/139
[58] Field of Search ......................................... 43/139

[56] References Cited
U.S. PATENT DOCUMENTS

| | | | |
|---|---|---|---|
| 1,029,972 | 6/1912 | Britton | 43/139 |
| 1,517,131 | 11/1924 | Thompson | 43/139 |
| 3,214,861 | 11/1965 | Arther | 43/139 |

Primary Examiner—Louis G. Mancene
Assistant Examiner—Daniel J. Leach
Attorney, Agent, or Firm—Howard I. Podell

[57] ABSTRACT

A motorized vacuum unit fitted with an intake nozzle that may be readily pointed towards a fly or other flying insect to catch and draw the flying insect into a mesh cage inside the unit. The nozzle is pivotably mounted to the body of the unit so that rotation of the nozzle provides access to the cage for emptying of its contents. A battery, motor and suction fan are mounted in the body which is fitted with a fixed handle surrounding a recess in the body to enable grasping of the body by a hand of the user, with the axis of the handle parallel to the axis of the nozzle.

2 Claims, 2 Drawing Figures

FLY GUN

SUMMARY OF THE INVENTION

My invention is a motorized vacuum unit fitted with an intake nozzle that may be readily pointed towards a fly or other flying insect to catch and draw the flying insect into a mesh case inside the unit. The nozzle is pivotably mounted to the body of the unit so that rotation of the nozzle provides access to the cage for emptying of its contents. A battery, motor and suction fan are mounted in the body which is fitted with a fixed handle surrounding a recess in the body to enable grasping of the body by a hand of the user, with the axis of the handle parallel to the axis of the nozzle.

BRIEF DESCRIPTION OF THE DRAWINGS:

The objects and features of the invention may be understood with reference to the following detailed description of an illustrative embodiment of the invention, taken together with the accompanying drawings in which.

Figure 1:
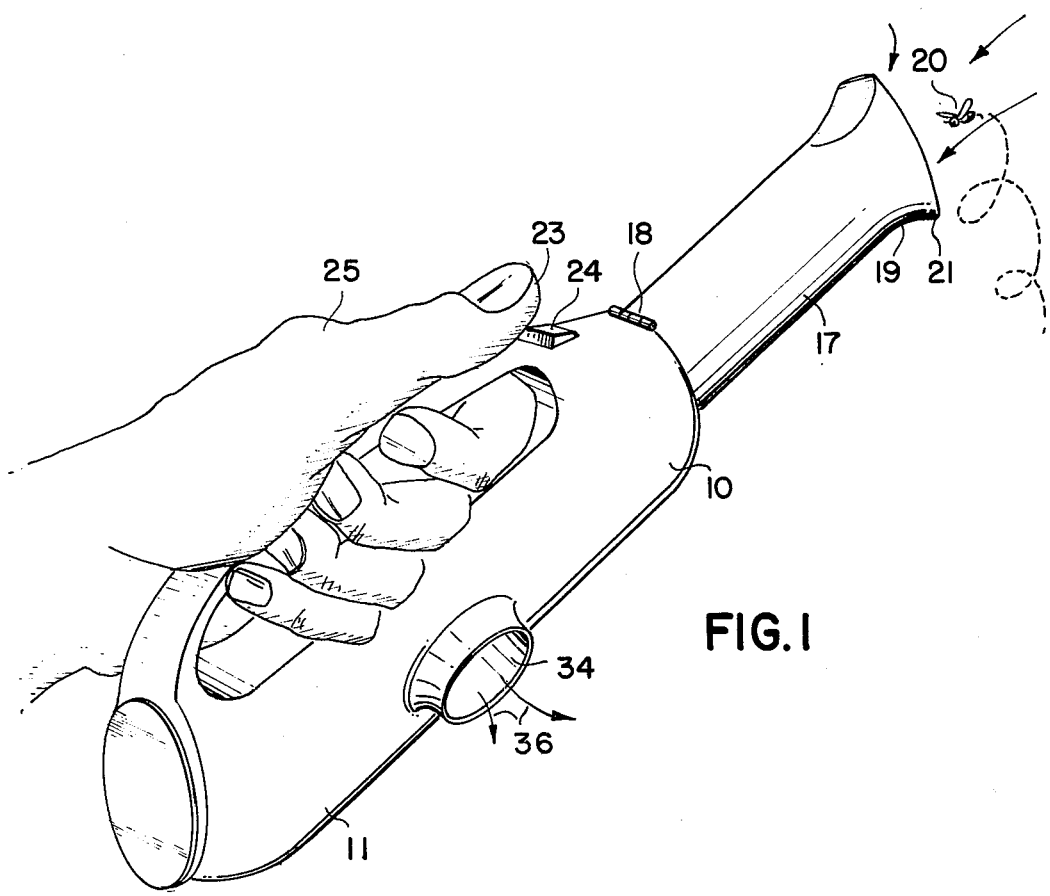
FIG. 1 is a perspective view of the invention in use.
Figure 2:
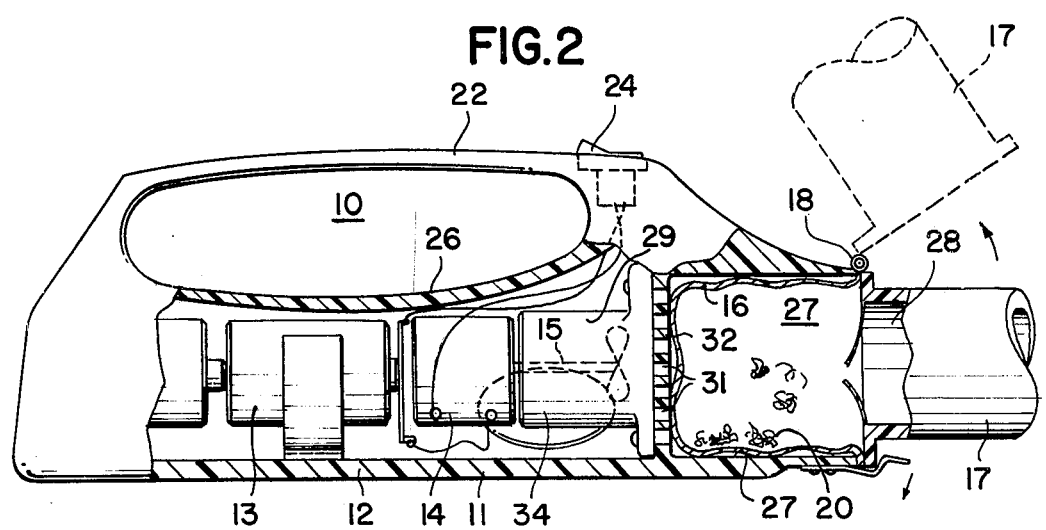
FIG. 2 is a fragmentary sectional view of the invention.

DESCRIPTION OF THE PREFERRED EMBODIMENT:

Turning now descriptively to the drawings, in which similar reference characters denote similar elements throughout the several views, FIGS. 1-2 illustrate the fly gun unit 10, which is formed of a body section 11, the housing 12 of which encloses a battery 13, fan motor 14, suction fan 15 and mesh cage 16, with a tubular nozzle section 17 pivotably mounted by hinge 18 to the housing 12.

Nozzle 17 is formed with a flared mouth section 19 in which the rim 21 of the nozzle mouth is of larger circumference than the tubular body section of the nozzle 17 for the purpose of drawing in air and insects 20 flying in air adjacent to the nozzle mouth rim 21.

A handle 22, the axis of which is oriented parallel to the axis of the nozzle 17 is fitted to the body section 11 with a switch button 24 for controlling the fan motor 14 mounted forward of the handle so as to be reachable by the thumb 23 of a hand 25 of the user grasping the handle 22. A recessed section 26 of the body housing 12 is formed adjacent the handle to provide clearance for the hand 25 gripping handle 22.

An interior chamber 27, open to the nozzle interior 28, is formed in the housing 12 for containment of a removable mesh cage 16 in which trapped insects 20 are accumulated, with the cage 16 separated from the chamber 29 housing the fan 15 by a partition wall 31 formed with through perforations 32. An outlet opening 34 is formed in housing 12 joining the fan chamber 29 to provide unrestricted flow of air out of the fan chamber and located in the external wall forming the housing at a position facing away from and at right angles to the axis off the handle so that the exhaust air 36 from fan chamber 29 is expelled in a direction away from both the hand 25 and body of a user pointing the fly gun unit 10 at an insect in front of the user, with the exhaust air 36 being directed at right angles to the intake opening of the nozzle rim 21.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A portable hand-held motorized suction unit for use in entrapping flying insects, comprising
    a housing enclosing a motorized fan in an interior chamber, said housing formed with an inlet opening to said chamber to which opening nozzle section having an internal opening is externally joined, with
    a mesh cage mounted in said chamber between the said fan and said nozzle opening, said cage open to the said chamber inlet opening,
    said nozzle section formed with a flared inlet opening, in which
    a handle is externally mounted to the housing, the axis of which handle is generally parallel to the axis of the nozzle section, amd perpendicular to the axis of
    an external exhaust opening formed in the housing, which is joined to said interior chamber, said exhaust opening extending to the atmosphere in a direction perpendicular both to the axis of the nozzle section and to the axis of the handle so that exhaust air expelled through said outlet opening to the atmosphere is directed away from both the inlet opening of the nozzle section and away from the body of a user holding the handle when the nozzle section is pointed forward of the body of the user.

2. The combination as recited in claim 1 in which the nozzle section is pivotally hinged to the housing at the inlet opening to the chamber so as to provide access to the mesh cage for emptying of the contents of the cage when the nozzle section is pivoted away from the inlet opening of the housing.

* * * * *